US008883943B2

(12) United States Patent
Wu et al.

(10) Patent No.: US 8,883,943 B2
(45) Date of Patent: Nov. 11, 2014

(54) ISOOLEFIN POLYMERS AND PROCESS FOR PREPARING THE SAME

(75) Inventors: Yixian Wu, Beijing (CN); Qiang Huang, Beijing (CN); Han Zhou, Beijing (CN); Ruting Jin, Beijing (CN); Ping He, Beijing (CN)

(73) Assignees: China Petroleum & Chemical Corporation, Beijing (CN); Beijing University of Chemical Technology, Beijing (CN)

( * ) Notice: Subject to any disclaimer, the term of this patent is extended or adjusted under 35 U.S.C. 154(b) by 0 days.

(21) Appl. No.: 13/497,405

(22) PCT Filed: Sep. 21, 2010

(86) PCT No.: PCT/CN2010/001462
§ 371 (c)(1),
(2), (4) Date: May 30, 2012

(87) PCT Pub. No.: WO2011/035544
PCT Pub. Date: Mar. 31, 2011

(65) Prior Publication Data
US 2012/0238715 A1    Sep. 20, 2012

(30) Foreign Application Priority Data

Sep. 25, 2009 (CN) .......................... 2009 1 0092795
Aug. 19, 2010 (CN) .......................... 2010 1 0257363
Aug. 19, 2010 (CN) .......................... 2010 1 0257364

(51) Int. Cl.
*C08F 4/52* (2006.01)
*C08F 4/28* (2006.01)

(52) U.S. Cl.
CPC ............... *C08F 10/10* (2013.01); *C08F 210/12* (2013.01)

USPC .......... 526/197; 526/227; 526/348; 526/210; 526/348.7; 526/346; 526/335

(58) Field of Classification Search
USPC .............. 526/197, 227, 348, 210, 348.7, 346, 526/335
See application file for complete search history.

(56) References Cited

U.S. PATENT DOCUMENTS 4,154,916 A    5/1979    Wagensommer et al.
4,269,955 A    5/1981    Wagensommer et al.

(Continued)

FOREIGN PATENT DOCUMENTS

CA    2 775 006 A1    3/2011
CN    87103538    11/1987

(Continued)

OTHER PUBLICATIONS

Kostjuk et al., "Cationic Polymerization of styrene in Solution and Aqueous Suspension Using $B(C_6F_5)_3$ as a Water-Tolerant Lewis Acid," *Macromolecules*, 39(9): 3110-3113 (2006).

(Continued)

*Primary Examiner* — William Cheung
(74) *Attorney, Agent, or Firm* — Finnegan, Henderson, Farabow, Garrett & Dunner, LLP

(57) ABSTRACT

The present invention relates to isoolefin polymers and process for preparing the same. The present invention especially discloses a polymerization process for the cationic polymerization of isoolefin monomers in an aqueous reaction medium, and isoolefin polymers obtained by such process. In one embodiment, the present invention relates to a polymerization process for the cationic polymerization of isoolefin monomers in an aqueous reaction medium, and isoolefin polymers obtained therefrom. In another embodiment, the present invention relates to a dispersion polymerization process for the cationic copolymerization of isoolefins with conjugated or non-conjugated diolefins and/or vinyl aromatic compounds, and copolymers obtained therefrom.

10 Claims, 1 Drawing Sheet

(51) Int. Cl.
*C08F 4/00* (2006.01)
*C08F 210/00* (2006.01)
*C08F 36/00* (2006.01)
*C08F 136/00* (2006.01)
*C08F 112/02* (2006.01)
*C08F 10/10* (2006.01)
*C08F 210/12* (2006.01)

(56) References Cited

U.S. PATENT DOCUMENTS

| | | | |
|---|---|---|---|
| 5,418,303 | A | 5/1995 | Shaffer |
| 5,668,232 | A | 9/1997 | Langstein et al. |
| 6,008,307 | A | 12/1999 | Shaffer |
| 6,300,444 | B1 | 10/2001 | Tokumoto et al. |
| 7,202,371 | B2 | 4/2007 | Yamamoto et al. |
| 7,485,764 | B2 | 2/2009 | Rath et al. |
| 2004/0014902 | A1 | 1/2004 | Johnson et al. |
| 2004/0014911 | A1 | 1/2004 | Huffer et al. |
| 2009/0130568 | A1* | 5/2009 | Tomari et al. ............. 430/2 |
| 2012/0329973 | A1 | 12/2012 | Wu et al. |

FOREIGN PATENT DOCUMENTS

| | | |
|---|---|---|
| CN | 1277212 | 12/2000 |
| CN | 1277617 A | 12/2000 |
| CN | 1681847 A | 10/2005 |
| CN | 101423579 | 5/2009 |
| EP | 0969026 | 1/2000 |
| EP | 0969026 A1 | 1/2000 |
| EP | 1013679 A1 | 6/2000 |
| JP | 10-504048 A | 4/1998 |
| JP | 10-130315 | 5/1998 |
| JP | 11-080221 | 3/1999 |
| JP | 11-080221 A | 3/1999 |
| JP | 2000017020 A | 1/2000 |
| JP | 2006523767 A | 10/2006 |
| WO | WO 2004/094481 | 11/2004 |
| WO | WO 2004/094486 | 11/2004 |
| WO | WO 2004/094486 A1 | 11/2004 |

OTHER PUBLICATIONS

Kostjuk et al. "Controlled Cationic Polymerization of Cyclopentadiene with $B(C_6F_5)_3$ as a Coinitiator in the Presence of Water," *Journal of Polymer Science, Part A: Polymer Chemistry*, 46: 4734-4747 (2008).
Lewis et al., "Aqueous Suspension Polymerization of Isobutene Initiated by $1,2-C_5F_4[B(C_6F_5)_2]_2$," *J. Am. Chem. Soc.*, 127: 46-47 (2005).
Radchenko et al., "Controlled/living cationic polymerization of styrene with $BF_3OEt_2$ as a coinitiator in the presence of water: Improvements and limitations," *European Polymer Journal*, 43: 2576-2583 (2007).
International Search Report mailed Dec. 30, 2010, in PCT Patent Application No. PCT/CN2010/001462.
Written Opinion mailed Dec. 30, 2010, in PCT Patent Application No. PCT/CN2010/001462.
PCT International Preliminary Report on Patentability issued Jul. 26, 2011, in International Application No. PCT/CN2010/001462.
PCT International Search Report mailed Jan. 13, 2011, in International Application No. PCT/CN2010/001463.
PCT Written Opinion of the International Searching Authority mailed Jan. 13, 2011, in International Application No. PCT/CN2010/001463.
PCT International Preliminary Report on Patentability issued Jul. 26, 2011, in International Application No. PCT/CN2010/001463.
Bauers, F.M. et al. (2001) "Aqueous Homo- and Copolymerization of Ethylene by Neutral Nickel(II) Complexes" *Macromolecules*, 34:1165-1171.
Fulmer et al. (2010), "NMR Chemical Shifts of Trace Impurities: Common Laboratory Solvents, Organics, and Gases in Deuterated Solvents Relevant to the Organometallic Chemist" *Organometallics*, 29:2176-2679.
Heaney, H. (1995) "Boron Trifluoride" in *Encyclopedia of Reagents for Organic Synthesis*. Paquette, L.A. (Ed.); John Wiley & Sons, Ltd.: Chichester, England. vol. 1, p. 651.
Satoh, K. et al. (1999) "Controlled Cationic Polymerization of *p*-Methoxystyrene in Aqueous Media with $Yb(OTf)_3$," *Macromolecules*, 32(12):3827-3832.
Satoh, K. et al. (2000) "Lanthanide Triflates-Mediated Emulsion Cationic Polymerization of *p*-Alkoxystyrenes in Aqueous Media" *Macromolecules*, 33:4660-4666.
Satoh, K. et al. (2000) "Metal Triflates and Tetrafluoroborates as Water-Tolerant Lewis Acids for Cationic Polymerization in Aqueous Media" *Macromolecules*, 33:5836-5840.
Satoh, K. et al. (2001) "Novel $BF_3OEt_2$/R-OH Initiating System for Controlled Cationic Polymerization of Styrene in the Presence of Water" *Macromolecules*, 34:396-401.
Soula, R. et al. (2002) "Catalytic Copolymerization of Ethylene and Polar and Nonpolar α-Olefins in Emulsion" *Macromolecules*, 35:1513-1523.
U.S. Appl. No. 13/497,453, filed Sep. 5, 2012, Wu et al.: Non-Final Office Action mailed Sep. 23, 2013.
Kostjuk, S.V. et al., "Controlled/Living Cationic Polymerization of *p*-Methoxystyrene in Solution and Aqueous Dispersion Using Tris(pentafluorophenyl)borane as a Lewis Acid: Acetonitrile Does the Job" *Macromolecules*, 40:482-490 (2007).
European Patent Application No. 10818238 by China Petroleum & Chemical Corp. et al.: Extended European Search Report, including Supplementary Search Report and Opinion, dated Jan. 28, 2014.
European Patent Application No. 10818239 by China Petroleum & Chemical Corp. et al.: Extended European Search Report, including Supplementary Search Report and Opinion, dated Jan. 28, 2014.
Canadian Patent Application No. 2,775,006: Office Action dated May 5, 2014.
Canadian Patent Application No. 2,775,006: Office Action dated Aug. 25, 2014.
Satoh et al., "Direct Synthesis of Amphiphillic Random and Block Copolymers of *p*-Hydroxystyrene and *p*-Methoxystyrene via Living Cationic Polymerization with $BF_3OEt_2$/ROH Systems," *Macromolecules* 33:5830-5835 (2000).

* cited by examiner

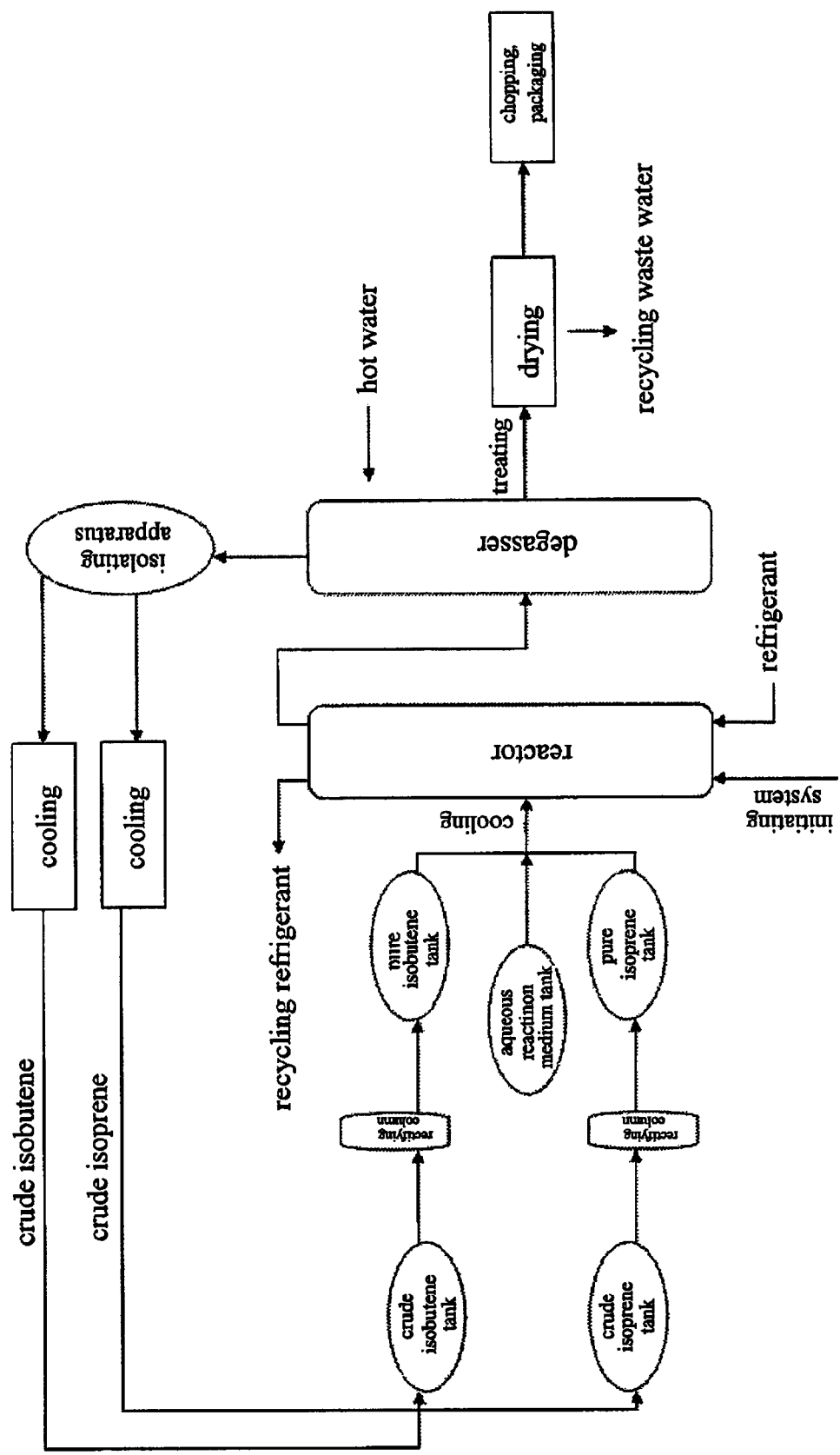

ISOOLEFIN POLYMERS AND PROCESS FOR PREPARING THE SAME

This application is a Section 371 National Stage Application of International Application No. PCT/CN2010/001462, filed Sep. 21, 2010, which claims priority from Chinese Patent Application Serial No. 200910092795.2, filed on Sep. 25, 2009, Chinese Patent Application Serial No. 200910257363.5, filed on Aug. 19, 2010, and Chinese Patent Application Serial No. 200910257364.X, filed on Aug. 19, 2010.

TECHNICAL FIELD

The present invention relates to isoolefin polymers and process for preparing the same. The present invention specially relates to a polymerization process for cationic polymerization of isoolefin monomers in an aqueous reaction medium, and isoolefin polymers obtained therefrom. In one embodiment, the present invention relates to a polymerization process for cationic polymerization of isoolefin monomers, and isoolefin polymers obtained therefrom. In another embodiment, the present invention relates to a polymerization process for cationic polymerization of isoolefins with conjugated diolefins and/or vinyl aromatic compounds, and isoolefin copolymers obtained therefrom.

BACKGROUND OF THE INVENTION

Cationic polymerization is one of the important processes for synthesizing polymer materials. Homopolymers of isoolefin monomers (e.g. isobutene), copolymers of isoolefins with isoprene (e.g. butyl rubber) and copolymers of isoolefins and vinyl aromatic compounds (styrene or derivatives thereof) (e.g. copolymers of isobutene and p-methylstyrene) are the most primary industrial products via cationic polymerization and have a great market demand. Since trace of impurities have an extremely great effect on the cationic polymerization process, the polymerization needs to be conducted under the conditions of almost no oxygen, no water and protection with high purity inert gases and by the technological process of slurry polymerization and solution polymerization. Taking the industrial production of butyl rubber by slurry polymerization process as an example, the polymerization needs to be conducted in the reaction medium of dry chloroalkane at a temperature as low as −100° C. The raw materials, such as isobutene, isoprene and chloroalkane (e.g. methyl chloride) cannot be used unless they are strictly refined and dried. After polymerization, methyl chloride, unreacted monomeric isobutene and isoprene need to be isolated and recovered, and then further strictly refined and dried. Moreover, HCl is produced from methyl chloride during the post-treatment, which results in the apparent corrosion of the equipment. In the production of butyl rubber by the cationic solution polymerization, the heat and mass transfer are difficult since solution viscosity increases remarkably with decreasing polymerization temperature. Thus the monomer conversion has to be controlled under 20%-30%. As a result, the production efficiency is low and the product quality is difficult to be improved and controlled. A great deal of solvents need to be recovered and refined, and the solvent recovery equipment, rectifying unit and drying system having a high processing capacity need to be constructed correspondingly. Meanwhile, the water and oxygen content in the polymerization system should be necessarily and strictly controlled to be several ppm or even lower to synthesize butyl rubber with high molecular weight. Thus the current technological procedures for preparing isoolefin polymers (e.g. butyl rubber) by cationic polymerization are complicated, have strict requirements on the equipment and raw materials and have a high production cost. The current similar cationic polymerization system uses organic solvents as the reaction medium, and requires that the water content therein is lower than several ppm. In the current industrial production of cationic polymerization, the conventional cationic polymerization processes and corresponding continuous polymerization technological procedures require extremely strict dehydration and deoxygenation procedures, to enable the polymerization system and raw materials to achieve the rigor reaction conditions of almost no oxygen and no water, and need to be conducted under the protection of high purity inert gases. It enables the polymerization process and procedures to be extremely complicated and results in rigor requirements on the operation conditions, high equipment investment, high production cost, great technical difficulties and many chemical process units.

During the preparation of butyl rubber, the effect of heat transfer of organic solvents is relatively low. Particularly for the solution polymerization system having a high viscosity, a great deal of instant reaction heat can not be effectively removed in a short period of time unless there is a plurality of ethylene evaporating capacities. Then, it requires a complex reactor and a great ethylene refrigerant circulation, so as to enable the refrigeration system to be bulky and complex. CN101423579A further discloses a system and process in which the cold energy of liquefied natural gas (LNG) having a low temperature (a pressure of 0.1-10 MPa and a temperature of −162° C.~−150° C.) is used for synthesis of butyl rubber. However, the refrigeration system is complex, and is difficult to be adjusted and controlled.

If water is used as the environmentally-friendly reaction medium for cationic polymerization, it may simplify the polymerization and production process, the equipments and reaction conditions, reduce the production cost and improve the heat and mass transfer. Therefore, it is significant to use an aqueous medium as the reaction medium for the cationic polymerization.

There has been a growing interesting recently in the cationic polymerization using water as the reaction medium. However, the prior art of vinyl monomer cationic polymerization in the aqueous reaction medium is faced with many problems, such as high cost of initiating system, complex technological process, low polymerization efficiency, low molecular weight of resulted polymer products and the like. Moreover, these Lewis acids which have a high cost or are prepared specially are required as co-initiators. These problems in the prior art may refer to WO2004094481A2, WO2004094486A1, JP10130315, JP11080221, "Cationic Polymerization of styrene in Solution and Aqueous Suspension Using $B(C_6F_5)_3$ as a Water-Tolerant Lewis Acid" (Kostjuk S. V. and Ganachaud F., *Macromolecules*, vol. 39), "Controlled/living cationic polymerization of styrene with $BF_3 \cdot OEt_2$ as a coinitiator in the presence of water: Improvements and limitations" (Radchenko A. V., Kostjuk S. V. and Vasilenko I. V., et al, *European Polymer Journal*, Vol. 43, 2007), "Controlled Cationic Polymerization of Cyclopentadiene with $B(C_6F_5)_3$ as a Coinitiator in the Presence of Water" (Kostjuk S. V., Radchenko A. V. and Ganachaud F., *Journal of Polymer Science, Part A: Polymer Chemistry*, Vol. 46, 2008). Thus the development of a new initiating system having a high activity, low cost, commercially obtainable raw materials and being easy and convenient to be used in a polymerization process are the key points for solving the problems in cationic polymerization in aqueous medium in the prior art, and can create conditions for simplifying the technological process, increasing the polymerization efficiency, synthesizing high molecular weight polymer products, reducing the cost and the like. However, the technologies and procedures of the cationic polymerization of the cationic-polymerizable monomers co-initiated directly by Lewis acid such as $AlCl_3$, $AlRCl_2$, $BF_3$, $TiCl_4$, $FeCl_3$, $SnCl_4$, $ZnCl_2$ and the like in the aqueous medium or even in a reaction medium which is totally water have not been reported yet.

CONTENTS OF THE INVENTION

One object of the present invention is to provide a polymerization process for cationic polymerization of vinyl monomers, and the corresponding polymers obtained therefrom, so as to overcome one or more shortcomings in the prior art. In particular, one object of the present invention is to provide a polymerization process for cationic homopolymerization or copolymerization of vinyl monomers in the aqueous reaction medium by the initiating system of the present invention. These objects and other objects of the present invention are fulfilled by means of the embodiments of the present invention described herein.
The technical solutions of the present invention include:

Embodiment 1

A polymerization process for the cationic polymerization, wherein said polymerization process comprises the following steps:
(1) forming a polymerization system comprising the following ingredients:
   an initiating system consisting of an initiator, an additive, Lewis acid and an optional diluent;
   an aqueous reaction medium;
   isoolefin monomers and optional copolymerizable monomers; and
   an optional dispersant;
(2) polymerizing the polymerization system formed in step (1), to obtain homopolymers of isoolefin monomers or copolymers of isoolefin monomers and optional copolymerizable monomers.

Embodiment 2

The polymerization process according to Embodiment 1, wherein step (1) comprises firstly forming an initiating system, then mixing the resultant initiating system with isoolefin monomers, optional copolymerizable monomers, an aqueous medium and an optional dispersant; or mixing one or more selected from the group consisting of an initiator, an additive, a Lewis acid and an optional diluent directly with isoolefin monomers, optional copolymerizable monomers, an aqueous reaction medium and an optional dispersant.

Embodiment 3

The polymerization process according to Embodiment 1, wherein the formation of the initiating system comprises mixing an initiator, an additive, a Lewis acid and an optional diluent; or firstly mixing the initiator with Lewis acid, then with the additive; or firstly mixing the additive with Lewis acid, and then with the initiator.

Embodiment 4

The polymerization process according to Embodiment 1, which comprises directly adding the initiator into the mixture of isoolefin monomers, optional copolymerizable monomers and an aqueous reaction medium; or adding a part of the initiator into the mixture of isoolefin monomers, optional copolymerizable monomers and an aqueous reaction medium, and mixing the remaining initiator with the additive and Lewis acid and then adding into the polymerization system.

Embodiment 5

The polymerization process according to Embodiment 1, wherein the initiating system is formulated into the mixture solution with diluent such as organic solvent in the aqueous reaction medium, or is directly used under the condition of no diluent.

Embodiment 6

The polymerization process according to any of Embodiments 1-5, wherein the polymerization process is a batchwise polymerization method, a semi-continuous polymerization method or a continuous polymerization method.

Embodiment 7

The polymerization process according to any of Embodiments 1-6, wherein the isoolefin monomer is selected from the compounds having the following structural formula

wherein $R^1$ represents H or $C_1$-$C_{10}$ alkyl, preferably methyl; $R_2$ represents $C_1$-$C_{10}$ alkyl or $C_3$-$C_{10}$ cycloalkyl; and/or
the copolymerizable monomer is selected from the group consisting of conjugated or non-conjugated $C_4$-$C_{20}$ diolefins, vinyl aromatic compounds and combinations of conjugated or non-conjugated $C_4$-$C_{20}$ diolefins with vinyl aromatic compounds.

Embodiment 8

The polymerization process according to any of Embodiments 1-7, wherein the aqueous reaction medium is free of halogenated hydrocarbons.

Embodiment 9

The polymerization process according to any of Embodiments 1-8, wherein the polymerization system exhibits a homogeneously dispersed state before, during and/or after polymerization, and the particle size preferably ranges from 1 to 3,000 μm.

Embodiment 10

A homopolymer of isoolefin monomers or a copolymer of isoolefin monomers and optional copolymerizable monomers, prepared by the polymerization process according to any of Embodiments 1-9.

More specifically, the present invention relates to isoolefin polymers and process for preparing the same. The present invention specially relates to a polymerization process for cationic polymerization of isoolefin monomers in an aqueous reaction medium, and isoolefin polymers obtained therefrom. In one embodiment, the present invention relates to a polymerization process for cationic polymerization of isoolefin monomers and isoolefin polymers obtained therefrom. In one embodiment, the present invention relates to a polymerization process for cationic polymerization of isoolefins with conjugated or non-conjugated diolefins and/or vinyl aromatic compounds, and isoolefin polymers obtained therefrom.

DETAILED DESCRIPTION OF THE INVENTION

The present invention provides an initiating system for cationic polymerization of vinyl monomers in an aqueous reaction medium.

The present invention provides a cationic polymerization system comprising the initiating system of the present invention, vinyl monomers, aqueous reaction medium and optional dispersant.

The present invention provides a polymerization process for cationic polymerization of vinyl monomers in an aqueous reaction medium by using the initiating system of the present invention.

The present invention provides a polymerization process for cationic polymerization of vinyl monomers in an aqueous reaction medium by using the initiating system of the present invention in the absence of organic medium such as halogenated hydrocarbons.

The present invention provides a polymerization process for cationic polymerization of vinyl monomers in a reaction medium which is totally water by using the initiating system of the present invention.

The present invention provides a polymer or copolymer prepared by polymerizing vinyl monomers in an aqueous reaction medium by means of the initiating system of the present invention.

The following specific disclosure of the present invention is suitable for each aspect of the invention above.

1. Initiating System

The initiating system of the present invention is an initiating system for initiating the cationic polymerization of cationic-polymerizable monomers in an aqueous reaction medium. The initiating system of the present invention comprises an initiator, Lewis acid, an additive and an optional diluent.

(1) Initiator

The initiator is selected from the group consisting of the compounds which can provide the cation source, specifically from the group consisting of the compounds which can provide protons, or from the group consisting of the organic tertiary alkyl or aralkyl functional compounds which are used as cationogens, or from the group consisting of the adducts of hydrogen halides and monomers, or mixtures of these substances, preferably from the group consisting of the compounds which can provide protons and/or of the adducts of hydrogen halides and monomers.

The compound which can provide protons is at least one selected from the group consisting of $H_2O$, hydrogen halide, protonic acid, carboxylic acid, alcohol and phenol. More specifically, the compound which can provide protons is one or more selected from the group consisting of $H_2O$, hydrogen halide, protonic acid, organic carboxylic acids containing $C_1$-$C_{14}$ alkyl, aryl $C_1$-$C_{14}$ alkyl and $C_1$-$C_{14}$ alkylaryl, phenol, $C_1$-$C_{14}$ alkyl mono-substituted phenol or multi-$C_1$-$C_{14}$ alky substituted phenol, alcohol containing $C_1$-$C_{14}$ alkyl and aryl $C_1$-$C_{14}$ alkyl. Said aryl or aryl in the aryl-containing group may be, e.g. phenyl or naphthyl. In the present invention, water in the reaction medium may partially function as an initiator.

The adducts of hydrogen halides and monomers are preferably selected from the group consisting of the adducts of isobutene, styrene, α-methylstyrene, p-methylstyrene or vinyl ether with HCl, HBr or HI.

The organic tertiary alkyl or aralkyl functional compounds are one or more selected from the group consisting of esters, alcohols, ethers, peroxides, epoxides or halides (e.g. chlorides), benzyl halides (e.g. benzyl chlorides) or benzyl halides (e.g. benzyl chlorides) substituted by one or more $C_1$-$C_{14}$ alkyl group.

The molar ratio of the initiator to the monomer is $(1.0 \times 10^{-6}$–$5.0 \times 10^{-1})$:1, preferably $(1.5 \times 10^{-6}$–$4.0 \times 10^{-1})$:1 or $(2 \times 10^{-6}$–$3.0 \times 10^{-1})$:1, more preferably $(2.2 \times 10^{-6}$–$2.0 \times 10^{-1})$:1 or $(2.4 \times 10^{-6}$–$1.5 \times 10^{-1})$:1.

(2) Lewis Acid

According to the present invention, Lewis acid is a metal halide or an organic metal halide.

According to the present invention, Lewis acid may be one selected from the group consisting of the substances satisfying the general formula $MX_n$ or $YR_{n-m}X_m$, or mixtures thereof, wherein M is B, Al, Sn, Ti, Fe, Sb or Zn; X is F, Cl or Br; n is 2, 3, 4 or 5; m is 1, 2 or 3; Y is Al, Sn, Ti or Zn; R is selected from the group consisting of alkyl, aryl, arylalkyl, alkylaryl optionally substituted by halo substituents, wherein alkyl or alkyl in the alkyl-containing group may be, e.g. $C_1$-$C_{20}$ alkyl, especially $C_1$-$C_6$ alkyl; aryl or alkyl in the aryl-containing group may be, e.g. phenyl or naphthyl.

The $MX_n$-type compound is preferably one or more selected from the group consisting of $BF_3$, $BCl_3$, $AlCl_3$, $AlBr_3$, $SnCl_4$, $TiCl_4$, $TiBr_4$, $FeCl_3$, $SbCl_5$ and $ZnCl_2$; the $YR_{n-m}X_m$-type compound is preferably one or more selected from the group consisting of $Al(C_2H_5)Cl_2$, $Al(C_2H_5)_2Cl$, $Al(i\text{-}C_4H_9)Cl_2$, $Al(i\text{-}C_4H_9)_2Cl$, sesquiethyl aluminum chloride, sesquiisobutyl aluminum chloride, $Sn(C_2H_5)Cl_3$, $Sn(C_2H_5)_2Cl_2$, $Sn(C_2H_5)_3Cl$ and $Zn(C_2H_5)Cl$.

The molar ratio of the Lewis acid to the monomer is $(9.0 \times 10^{-5}$–$5.0 \times 10^{-1})$:1, preferably $(1.0 \times 10^{-4}$–$4.0 \times 10^{-1})$:1, more preferably $(1.5 \times 10^{-1}$–$3.5 \times 10^{-1})$:1, more preferably $(2.0 \times 10^{-4}$–$3.0 \times 10^{-1})$:1, more preferably $(2.5 \times 10^{-4}$–$2.5 \times 10^{-1})$:1.

(3) Additive

According to the present invention, said additive may be at least one organic compound containing nitrogen, oxygen, sulfur, phosphor atoms, and preferably have the general structural formula of R—X—Y.

The moiety R is selected from the group consisting of linear or branched or cyclic $C_1$-$C_{20}$ alkyl, aryl, aryl $C_1$-$C_{20}$ alkyl, $C_1$-$C_{20}$ alkylaryl, $C_1$-$C_{20}$ alkoxy, aryloxy or aryl $C_1$-$C_{20}$ alkoxy group, which are optionally substituted by halo or nitro substituent, preferably from the group consisting of linear or branched or cyclic $C_1$-$C_{12}$ alkyl, phenyl, phenyl $C_1$-$C_{12}$ alkyl, $C_1$-$C_{12}$ alkylphenyl, $C_1$-$C_{12}$ alkoxy, aryloxy or aryl $C_1$-$C_{12}$ alkoxy group, which are optionally substituted by halo or nitro substituent, wherein aryl or aryl in the aryl-containing group may be phenyl or naphthyl.

The moiety of X requires at least one of O atom, N atom, S atom and P atom, and the structure is preferably one selected from the group consisting of —O—, —N—, —CO—, —COO—, —CON—, —S—, —SO—, —OSO—, —P—, —PO—, —PO$_3$—, —PO$_4$— and —PS—, more preferably from the group consisting of —O—, —CO—, —COO—, —CON—, —S—, —SO—, —OSO—, —P—, —PO—, —PO$_3$—, —PO$_4$—, and —PS—.

The moiety of Y is selected from the group consisting of H, halo, linear or branched or cyclic $C_1$-$C_{20}$ alkyl, aryl, aryl $C_1$-$C_{20}$ alkyl, $C_1$-$C_{20}$ alkylaryl, $C_1$-$C_{20}$ alkoxy, aryloxy or aryl $C_1$-$C_{20}$ alkoxy, which are optionally substituted by halo or nitro substituent, preferably from the group consisting of H, linear or branched or cyclic $C_1$-$C_{12}$ alkyl, phenyl, phenyl $C_1$-$C_{12}$ alkyl, $C_1$-$C_{12}$ alkylphenyl, $C_1$-$C_{12}$ alkoxy, aryloxy or aryl $C_1$-$C_{12}$ alkoxy, which are optionally substituted by halo or nitro substituent. R and Y, each is independently from the other, may be linked by the chemical bond so as to make the molecules form a ring. Said aryl or the aryl in the aryl-containing group may be phenyl or naphthyl. Said halo is preferably selected from the group consisting of chlorine and bromine.

More specifically, the additive satisfying the structure of R—X—Y in the current compounds having the known structure comprises the following types of compounds:

The oxygen-containing compound is preferably at least one of the compounds having the general structural formula, i.e. ethers having the general structural formula $R_1OR_2$, alcohols or phenols having the general structural formula $R_3OH$, ketones having the general structural formula $R_4COR_5$, or esters having the general structural formula $R_6COOR_7$, wherein $R_1$-$R_7$ is selected from the group consisting of same or different linear or branched or cyclic $C_1$-$C_{20}$ alkyl, aryl $C_1$-$C_{20}$ alkyl, aryl or $C_1$-$C_{20}$ alkylaryl, preferably $C_1$-$C_{12}$ alkyl, aryl $C_1$-$C_{12}$ alkyl, aryl or aryl $C_1$-$C_{12}$ alkyl, wherein aryl or the aryl in the aryl-containing group may be phenyl or naphthyl.

The nitrogen-containing compound is preferably at least one of the compounds having the general structural formula, i.e. amines having the general structural formula $R_8R_9R_{10}N$, or amides having the general structural formula $R_{11}CONR_{12}R_{13}$, wherein $R_{13}$ is selected from the group consisting of same or different linear or branched or cyclic $C_1$-$C_{20}$ alkyl, aryl $C_1$-$C_{20}$ alkyl, aryl or $C_1$-$C_{20}$ alkylaryl, preferably same or different $C_1$-$C_{12}$ alkyl, aryl $C_1$-$C_{12}$ alkyl, aryl or $C_1$-$C_{12}$ alkylaryl; $R_8$-$R_{12}$ is selected from the group consisting of H, same or different linear or branched or cyclic $C_1$-$C_{20}$ alkyl, aryl $C_1$-$C_{20}$ alkyl or aryl, preferably H, same or different $C_1$-$C_{12}$ alkyl, aryl $C_1$-$C_{12}$ alkyl, aryl or $C_1$-$C_{12}$ alkylaryl, wherein aryl or the aryl in the aryl-containing group may be phenyl or naphthyl.

The sulfur-containing compound is preferably at least one of the substances having the following general formulae, i.e. compounds of thioethers ($R_{14}$—S—$R_{15}$), sulfones ($R_{16}R_{17}SO_2$) and sulfoxides ($R_{18}R_{19}SO$) or derivatives thereof, wherein $R_{14}$-$R_{19}$ respectively and independently represent linear or branched or cyclic $C_1$-$C_{20}$ alkyl, aryl, aryl $C_1$-$C_{20}$ alkyl, $C_1$-$C_{20}$ alkylaryl, $C_1$-$C_{20}$ alkoxy, aryloxy or aryl $C_1$-$C_{20}$ alkoxy, which are optionally substituted by halo or nitro substituent, or $R_{14}$ and $R_{15}$, $R_{16}$ and $R_{17}$ or $R_{18}$ and $R_{19}$ are bonded to form $C_4$-$C_{20}$alkylidene radical or cycloalkylidene, preferably $C_1$-$C_{12}$ alkyl, aryl, aryl $C_1$-$C_{12}$ alkyl, $C_1$-$C_{12}$ alkylaryl, $C_1$-$C_{12}$ alkoxy, aryloxy or aryl $C_1$-$C_{12}$ alkoxy, which are optionally substituted by halo or nitro substituent, or $R_{14}$ and $R_{15}$, $R_{16}$ and $R_{17}$ or $R_{18}$ and $R_{19}$ are bonded to form $C_4$-$C_{12}$ alkylidene radical or cycloalkylidene, wherein aryl or the aryl in the aryl-containing group may be phenyl or naphthyl.

The phosphor-containing compound is preferably at least one of the substances having the following general formulae, i.e. phosphines ($R_{20}PR_{21}R_{22}$), phosphine oxides ($R_{23}R_{24}R_{25}PO$), phosphates ($R_{26}R_{27}R_{28}PO_4$), phosphite ($R_{29}R_{30}R_{31}PO_3$), wherein $R_{20}$, $R_{23}$, $R_{26}$ and $R_{29}$ may represent H, halo, linear or branched or cyclic $C_1$-$C_{20}$ alkyl, aryl, aryl $C_1$-$C_{20}$ alkyl, $C_1$-$C_{20}$ alkylaryl, $C_1$-$C_{20}$ alkoxy, aryloxy or aryl $C_1$-$C_{20}$ alkoxy, which are optionally substituted by halo or nitro substituent, preferably H, halo, $C_1$-$C_{12}$ alkyl, aryl, aryl $C_1$-$C_{12}$ alkyl, $C_1$-$C_{12}$ alkylaryl, which are optionally substituted by halo or nitro substituent; $R_{21}$, $R_{22}$, $R_{24}$, $R_{25}$, $R_{27}$ and $R_{28}$ respectively and independently represent linear or branched or cyclic $C_1$-$C_{20}$ alkyl, aryl, aryl $C_1$-$C_{20}$ alkyl, $C_1$-$C_{20}$ alkylaryl, which are optionally substituted by halo or nitro substituent, preferably $C_1$-$C_{12}$ alkyl, aryl, aryl $C_1$-$C_{12}$ alkyl, $C_1$-$C_{12}$ alkylaryl, which are optionally substituted by halo or nitro substituent, wherein aryl or the aryl in the aryl-containing group may be phenyl or naphthyl; said halo is preferably selected from the group consisting of chlorine and bromine.

The sulfur- and phosphor-containing compound is preferably at least one of the compounds having the general structural formula $R_{30}PSR_{31}R_{32}$ and derivatives thereof, wherein $R_{30}$, $R_{31}$ and $R_{32}$ respectively and independently represent H, halo, linear or branched or cyclic $C_1$-$C_{20}$ alkyl, aryl, aryl $C_1$-$C_{20}$ alkyl, $C_1$-$C_{20}$ alkylaryl, $C_1$-$C_{20}$ alkoxy, aryloxy or aryl $C_1$-$C_{20}$ alkoxy, which are optionally substituted by halo or nitro substituent, preferably H, halo, $C_1$-$C_{12}$ alkyl, aryl, aryl $C_1$-$C_{12}$ alkyl, $C_1$-$C_{12}$ alkylaryl, $C_1$-$C_{12}$ alkoxy, aryloxy or aryl $C_1$-$C_{12}$ alkoxy, which are optionally substituted by halo or nitro substituent, wherein aryl or the aryl in the aryl-containing group may be phenyl or naphthyl; said halo is preferably selected from the group consisting of chlorine and bromine.

In one embodiment, said additive may be a compound of the structural formula $R_1$—X—Y, or mixtures thereof, wherein $R_1$ is selected from the group consisting of $C_1$-$C_{20}$ alkyl, aryl $C_1$-$C_{20}$ alkyl, aryl, $C_1$-$C_{20}$ alkylaryl, halo-substituted $C_1$-$C_{20}$ alkyl, halo-substituted aryl $C_1$-$C_{20}$ alkyl, substituted aryl and halo-substituted $C_1$-$C_{20}$ alkylaryl, preferably from the group consisting of $C_1$-$C_8$ alkyl, phenyl $C_1$-$C_8$ alkyl, phenyl, $C_1$-$C_8$ alkylphenyl, chlorine substituted $C_1$-$C_8$ alkyl, chlorine substituted phenyl $C_1$-$C_8$ alkyl, chlorine substituted phenyl or chlorine substituted $C_1$-$C_8$ alkylphenyl, wherein aryl or aryl in the aryl-containing group may be phenyl or naphthyl.

The structure of X at least comprises one of O atom and N atom, preferably one of —O—, —N—, —CO—, —COO— and —CON—, more preferably one of —O—, —CO—, —COO— and —CON—.

Y is selected from the group consisting of H, $C_1$-$C_{20}$ alkyl, aryl $C_1$-$C_{20}$ alkyl, aryl, $C_1$-$C_{20}$ alkylaryl, halo-substituted $C_1$-$C_{20}$ alkyl, halo-substituted aryl $C_1$-$C_{20}$ alkyl, halo-substituted aryl or halo-substituted $C_1$-$C_{20}$ alkylaryl, preferably from the group consisting of H, $C_1$-$C_8$ alkyl, phenyl $C_1$-$C_8$ alkyl, phenyl or $C_1$-$C_8$ alkylphenyl, chlorine-substituted $C_1$-$C_8$ alkyl, chlorine-substituted phenyl $C_1$-$C_8$ alkyl, chlorine-substituted phenyl and chlorine-substituted $C_1$-$C_8$ alkylphenyl, wherein aryl or aryl in the aryl-containing group may be phenyl or naphthyl.

Among the above additives, alcohol compounds may be selected from the group consisting of methanol, ethanol, propanol, butanol, amyl alcohol, hexanol, enanthol, octanol, benzyl alcohol, phenylethyl alcohol, phenylpropanol, phenylbutyl alcohol, methyl benzyl alcohol; ether compounds may be selected from the group consisting of ethyl ether, propyl ether, butyl ether, amyl ether, hexyl ether, heptyl ether, octyl ether, anisole, phenyl propyl ether, phenyl butyl ether, diphenyl ether, xylene either, dibenzyl ether, dichlorobenzene ether and dichloromethylbenzene ether. Ketone compound may be selected from the group consisting of acetone, butanone, pentanone, hexanone, heptanone, octanone, acetophenone, phenylethylketone, phenyl propyl ketone, valerophenone, phenylamylketone and phenylhexylketone. Ester compounds may be selected from the group consisting of methyl acetate, ethyl acetate, ethyl monochloroacetate, ethyl dichloroacetate, ethyl trichloroacetate, propyl acetate, butyl acetate, methyl propionate, ethyl propionate, propyl propionate, butyl propionate, methyl acrylate, ethyl acrylate, propyl acrylate, butyl acrylate, amyl acrylate, methyl butyrate, ethyl butyrate, propyl butyrate, butyl butyrate, methyl methacrylate, ethyl methacrylate, propyl methacrylate, butyl methacrylate, amyl methacrylate, methyl benzoate, ethyl benzoate, propyl benzoate, butyl benzoate, amyl benzoate, hexyl benzoate, heptyl benzoate, octyl benzoate, dimethyl phthalate, diethyl phthalate, dipropyl phthalate, diallyl phthalate, dibutyl phthalate, dioctyl phthalate, dimethyl terephthalate, diethyl terephthalate, dipropyl terephthalate, and dibutyl terephthalate.

Among the above additives, amine compounds may be selected from the group consisting of diethylamine, triethylamine, diphenylamine, amylamine, diethyl methyl amine, N,N-dimethylhexylamine, N-methylbutylamine, N,N-dimethylbutylamine, N-ethylbutylamine, hexylamine, N-methylhexylamine, N-butylpropylamine, heptyl amine, 2-aminoheptane, 3-aminoheptane, N,N-dipropylethylamine, N,N-dimethylhexylamine, octylamine, aniline, benzylamine, N-methylaniline, phenylbutylamine, N-butylaniline, N,N-diethylaniline, 2,6-diethylaniline, and triphenylamine. Amide compounds may be selected from the group consisting of N,N-dimethylformamide, N,N-dimethylacetamide, N,N-diethylformamide and N,N-diethylacetamide.

In another embodiment, the additive may be one or more selected from the group consisting of sulfur-containing organic compounds, phosphor-containing organic compounds and sulfur- and phosphor-containing organic compounds.

More specifically, the sulfur-containing organic compound is preferably at least one selected from the group consisting of compounds of thioethers $R_1$—S—$R_2$, sulfones $R_3R_4SO_2$ and sulfoxides $R_5R_6SO$, or derivatives thereof, wherein $R_1$-$R_6$ respectively and independently linear or branched or cyclic $C_1$-$C_{20}$ alkyl, aryl, aryl $C_1$-$C_{20}$ alkyl, $C_1$-$C_{20}$ alkylaryl, $C_1$-$C_{20}$ alkoxy, aryloxy or aryl $C_1$-$C_{20}$ alkoxy, which are optionally substituted by halo or nitro substituent, or $R_1$-$R_6$ are bonded with functional groups to form $C_4$-$C_{20}$ cycloalkylidene radical or aryl-substituted alkylidene radical, wherein aryl or the aryl in the aryl-containing group may be phenyl or naphthyl.

Preferably, thioether compounds may be selected from the group consisting of diethyl sulfide, dipropyl sulfide, diisopropyl sulfide, dibutyl sulfide, diamyl sulfide, dihexyl sulfide, diheptyl sulfide, diphenyl sulfide, dinaphthyl sulfide, dianthryl sulfide, dibenzyl sulfide, xylyl sulfide, dichlorobenzene sulfide, dinitrophenyl sulfide, methylethyl sulfide, methylpropyl sulfide, methylbutyl sulfide, methylphenyl sulfide, ethylphenyl sulfide, propylphenyl sulfide, butylphenyl sulfide, cyclobutyl sulfide, cyclopentyl sulfide, cyclohexyl sulfide, cycloheptyl sulfide, cyclododecyl sulfide. More preferably, thioether compounds may be selected from the group consisting of dipropyl sulfide, dibutyl sulfide, diphenyl sulfide, dinaphthyl sulfide, dianthryl sulfide, and dibenzyl sulfide.

Preferably, sulfoxide compounds may be selected from the group consisting of dimethyl sulfoxide, diethyl sulfoxide, dipropyl sulfoxide, dibutyl sulfoxide, diamyl sulfoxide, dihexyl sulfoxide, diheptyl sulfoxide, diphenyl sulfoxide, dinaphthyl sulfoxide, dianthryl sulfoxide, dibenzyl sulfoxide, xylyl sulfoxide, dichlorobenzene sulfoxide, dinitrophenyl sulfoxide, methylethyl sulfoxide, methylpropyl sulfoxide, methylbutyl sulfoxide, methylphenyl sulfoxide, ethylphenyl sulfoxide, propylphenyl sulfoxide, butylphenyl sulfoxide, cyclobutyl sulfoxide, cyclopentyl sulfoxide, cyclohexyl sulfoxide, cycloheptyl sulfoxide, isobutyldodecyl sulfoxide. More preferably, sulfoxide compounds may be selected from the group consisting of dimethyl sulfoxide, dipropyl sulfoxide, dibutyl sulfoxide, diphenyl sulfoxide, dinaphthyl sulfoxide, dianthryl sulfoxide, dibenzyl sulfoxide, xylyl sulfoxide, and dichlorobenzene sulfoxide Preferably, sulfone compounds may be selected from the group consisting of dimethyl sulfone, diethyl sulfone, dipropyl sulfone, dibutyl sulfone, diamyl sulfone, dihexyl sulfone, diheptyl sulfone, diphenyl sulfone, dinaphthyl sulfone, dianthryl sulfone, dibenzyl sulfone, xylyl sulfone, dichlorobenzene sulfone, dinitrophenyl sulfone, methylethyl sulfone, methylpropyl sulfone, methylbutyl sulfone, methylphenyl sulfone, ethylphenyl sulfone, propylphenyl sulfone, butylphenyl sulfone, cyclobutyl sulfone, cyclopentyl sulfone, cyclohexyl sulfone, cycloheptyl sulfone, cyclododecyl sulfone. More preferably, sulfone compounds may be selected from the group consisting of dimethyl sulfone, dipropyl sulfone, dibutyl sulfone, diphenyl sulfone, dinaphthyl sulfone, dibenzyl sulfone, xylyl sulfone, dichlorobenzene sulfone and cyclobutyl sulfone.

The phosphor-containing organic compound is at least one of the organic phosphines $R_7PR_8R_9$, organic phosphine oxides $R_{10}R_{11}R_{12}P=O$, organic phosphates $R_{13}R_{14}R_{15}PO_4$, organic phosphites $R_{16}R_{17}R_{18}PO_3$, or derivatives thereof, wherein $R_7$, $R_{10}$, $R_{13}$ and $R_{16}$ in $R_7$-$R_{18}$ may represent H, halo, linear or branched or cyclic $C_1$-$C_{20}$ alkyl, aryl, aryl $C_1$-$C_{20}$ alkyl or $C_1$-$C_{20}$ alkylaryl, which are optionally substituted by halo or nitro substituent; $R_8$, $R_9$, $R_{11}$, $R_{12}$, $R_{14}$, $R_{15}$, $R_{17}$ and $R_{18}$ respectively and independent represent linear or branched or cyclic $C_1$-$C_{20}$ alkyl, aryl, aryl $C_1$-$C_{20}$ alkyl or $C_1$-$C_{20}$ alkylaryl, which are optionally substituted by halo or nitro substituent; wherein aryl or the aryl in the aryl-containing group may be phenyl or naphthyl; said halo is preferably selected from the group consisting of chlorine and bromine.

Preferably, phosphine compounds may be selected from the group consisting of triethyl phosphine, tripropyl phosphine, tributyl phosphine, triamyl phosphine, trihexyl phosphine, triheptyl phosphine, triphenyl phosphine, trinaphthyl phosphine, trianthryl phosphine, tribenzyl phosphine, trimethylphenyl phosphine, trichlorophenyl phosphine, trinitrophenyl phosphine, dimethyl phosphine, diethyl phosphine, dipropyl phosphine, dibutyl phosphine, diamyl phosphine, dihexyl phosphine, diheptyl phosphine, diphenyl phosphine, diphenylphosphine chloride, dinaphthyl phosphine, dianthryl phosphine, dibenzyl phosphine, xylyl phosphine, methyldiphenyl phosphine, ethyldiphenyl phosphine, propyl diphenyl phosphine, butyldiphenyl phosphine, tributoxyl phosphine, triphenoxyl phosphine. More preferably, phosphine compounds may be selected from the group consisting of tripropyl phosphine, tributyl phosphine, triphenyl phosphine, trinaphthyl phosphine, tribenzyl phosphine, trimethylphenyl phosphine and trichlorophenyl phosphine.

Preferably, phosphine oxide compounds may be selected from the group consisting of trimethyl phosphine oxide, triethyl phosphine oxide, tripropyl phosphine oxide, tributyl phosphine oxide, triamyl phosphine oxide, trihexyl phosphine oxide, triheptyl phosphine oxide, triphenyl phosphine oxide, trinaphthyl phosphine oxide, trianthryl phosphine oxide, tribenzyl phosphine oxide, trimethylphenyl phosphine oxide, trichlorophenyl phosphine oxide, trinitrophenyl phosphine oxide, dimethyl phosphine oxide, dimethylchloro phosphine oxide, diethyl phosphine oxide, dipropyl phosphine oxide, dibutyl phosphine oxide, diamyl phosphine oxide, dihexyl phosphine oxide, diheptyl phosphine oxide, diphenyl phosphine oxide, dinaphthyl phosphine oxide, dianthryl phosphine oxide, dibenzyl phosphine oxide, dimethylphenyl phosphine oxide, dichlorophenyl phosphine oxide, dinitrophenyl phosphine oxide, methyldiphenyl phosphine oxide, ethyldiphenyl phosphine oxide, propyldiphenyl phosphine oxide, butyldiphenyl phosphine oxide. More preferably, phosphine oxide compounds may be selected from the group consisting of trimethyl phosphine oxide, tripropyl phosphine oxide, tributyl phosphine oxide, triphenyl phosphine oxide, trinaphthyl phosphine oxide, trianthryl phosphine oxide, tribenzyl phosphine oxide, trimethylphenyl phosphine oxide, trichlorophenyl phosphine oxide, diphenyl phosphine oxide and diphenylchloro phosphine oxide.

Preferably, phosphate compounds may be selected from the group consisting of trimethyl phosphate, triethyl phosphate, tripropyl phosphate, tributyl phosphate, triamyl phosphate, trihexyl phosphate, triheptyl phosphate, triphenyl phosphate, trinaphthyl phosphate, trianthryl phosphate, tribenzyl phosphate, trimethylphenyl phosphate, trichlorophenyl phosphate, trinitrophenyl phosphate, dimethyl phosphate, dimethyl chlorophosphate, diethyl phosphate, dipropyl phosphate, dibutyl phosphate, diamyl phosphate, dihexyl phosphate, diheptyl phosphate, diphenyl phosphate, dinaphthyl phosphate, dianthryl phosphate, dibenzyl phosphate, dimethylphenyl phosphate, dichlorophenyl phosphate, dinitrophenyl phosphate, methyldiphenyl phosphate, ethyldiphenyl phosphate, propyldiphenyl phosphate, butyldiphenyl phosphate More preferably, phosphate compounds may be selected from the group consisting of trimethyl phosphate, triethyl phosphate, tripropyl phosphate, tributyl phosphate, triphenyl phosphate and tribenzyl phosphate.

Preferably, phosphite compounds may be selected from the group consisting of trimethyl phosphite, triethyl phosphite, tripropyl phosphite, tributyl phosphite, triamyl phosphite, trihexyl phosphite, triheptyl phosphite, triphenyl phosphite, trinaphthyl phosphite, tribenzyl phosphite, trimethylphenyl phosphite, trichlorophenyl phosphite, trinitrophenyl phosphite, dimethyl phosphite, diethyl phosphite, dipropyl phosphite, dibutyl phosphite, diamyl phosphite, dihexyl phosphite, diheptyl phosphite, diphenyl phosphite, dibenzyl phosphite, dimethylphenyl phosphite, dichlorophenyl phosphite, dinitrophenyl phosphite, methyldiphenyl phosphite, ethyldiphenyl phosphite, propyldiphenyl phosphite, butyldiphenyl phosphite More preferably, phosphite compounds may be selected from the group consisting of trimethyl phosphite, triethyl phosphite, tripropyl phosphite, tributyl phosphite, triphenyl phosphite and tribenzyl phosphite.

The sulfur- and phosphor-containing organic compound is at least one of the substances having the general structural formula $R_{19}PSR_{20}OR_{21}$, and derivatives thereof, wherein $R_{19}$, $R_{20}$ and $R_{21}$ respectively and independent represent H, halo, same or different linear or branched or cyclic $C_1$-$C_{20}$ alkyl, aryl, aryl $C_1$-$C_{20}$ alkyl, $C_1$-$C_{20}$ alkylaryl, $C_1$-$C_{12}$ alkoxy, aryloxy or aryl $C_1$-$C_{12}$ alkoxy group, which are optionally substituted by halo or nitro substituent, wherein aryl or the aryl in the aryl-containing group may be phenyl or naphthyl; said halo is preferably selected from the group consisting of chlorine and bromine.

Preferably, sulfur- and phosphor-containing organic compound may be selected from the group consisting of trimethyl phosphorous sulfide, triethyl phosphorous sulfide, triethoxyl phosphorous sulfide, tripropyl phosphorous sulfide, tributyl phosphorous sulfide, tributoxyl phosphorous sulfide, triphenyl phosphorous sulfide, triphenoxyl phosphorous sulfide, methyldiphenyl phosphorous sulfide, ethyldiphenyl phosphorous sulfide, trinaphthyl phosphorous sulfide, trianthryl phosphorous sulfide, tribenzyl phosphorous sulfide, tritolyl phosphorous sulfide, trichlorophenyl phosphorous sulfide, trinitrophenyl phosphorous sulfide, dimethyl phosphorous sulfide, diethyl phosphorous sulfide, dimethyl thiophosphoryl chloride. More preferably, sulfur- and phosphor-containing organic compound may be selected from the group consisting of trimethyl phosphorous sulfide, triethyl phosphorous sulfide and triphenyl phosphorous sulfide.

The additive may be the mixture of many compounds above.

The molar ratio of the additive to the monomer is $(1\times10^{-4}$–$5.0\times10^{-1})$:1, preferably $(2.0\times10^{-4}$–$4.5\times10^{-1})$:1 or $(2.5\times10^{-1}$–$4.0\times10^{-1})$:1, preferably $(2.8\times10^{-3}$–$3.0\times10^{-1})$:1, more preferably $(3.3\times10^{-3}$–$2.8\times10^{-1})$:1.

(4) Optional Diluent

The diluent may be any organic or inorganic solvent capable of mixing with other ingredients in the initiating system of the present invention to form a solution or dispersion. The organic solvent is preferred, and is one selected from the group consisting of alkanes, cycloalkanes, aromatics and halogenated hydrocarbons, or mixtures thereof. Halogenated hydrocarbons are, e.g. halogenated alkanes, halogenated cycloalkanes or halogenated aromatics. Arenes are, e.g. phenyl and mono- or multi-substituted alkylbenzene.

In one embodiment, the diluent may be the organic solvent in the aqueous reaction medium as stated in this invention.

The initiating system can be in-situ formed in the polymerization system, or pre-prepared before the polymerization. The initiating system may be prepared by various methods and is convenient to use. For example, the initiator, additive and Lewis acid are mixed according to different feeding manners and then directly used, or used after the reaction lasts a period of time; or the initiator is firstly mixed with Lewis acid, and then with the additive, and then directly used, or used after the mixing for a period of time; or the additive is mixed with Lewis acid and then directly used, or used in combination with the initiator after the reaction lasts a period of time. The initiator may be added into the mixture of the additive and Lewis acid, or the mixture of monomers and the reaction medium, to in-situ form an initiating system; or a part of the initiator is added into the mixture of monomers/reaction medium; and the remaining initiator is mixed with the additive and Lewis acid, and directly used or used after the mixing lasts a period of time. The temperature of mixing or reaction of the ingredients above may range from −90° C. to 50° C. The initiating system may be used with the diluent, or directly used under the condition of no diluent. Any optional diluent may be added into other ingredients of the initiating system, or any mixture of these ingredients at any time. In addition, the initiating system has the advantage of storage stability, and even maintains the activity after being deposited for several days or several months.

In the polymerization process of the present invention, the initiator, Lewis acid or additive may be directly used, or used after being formulated into the mixture solution with the mentioned diluents.

2. Monomers

The isoolefin polymers of the present invention comprise homopolymers of isoolefin monomers and copolymers of isoolefin monomers and copolymerizable monomers.

Isoolefin Monomers

Isoolefin monomers used herein are various isoolefin monomers commonly used in the art, e.g. isoolefin monomers disclosed in U.S. Pat. No. 5,668,232A. The full text of such patent is incorporated herein.

Isoolefin monomers having the following general structural formula are preferably used in the present invention:

$$CH_2=CR^1R^2$$

wherein $R^1$ represents H, $C_1$-$C_{10}$ alkyl, preferably methyl; $R^2$ represents $C_1$-$C_{10}$ alkyl or $C_3$-$C_{10}$ cycloalkyl.

Preferred isoolefins are selected from the group consisting of isobutene, 2-methylbutene, 3-methylbutene, 2-methylamylene, 3-methyl-amylene, 4-methylamylene or β-pinene (referring to U.S. Pat. No. 4,269,955 and U.S. Pat. No. 4,154,916), more preferably isobutene, 2-methylbutene and 2-methyl-pentylene.

Copolymerizable Monomers

Copolymerizable monomers used in the present invention comprise mono- or multi-unsaturated organic compounds, e.g. selected from conjugated or non-conjugated $C_4$-$C_{20}$ diolefins, such as those disclosed in U.S. Pat. No. 5,668,232A, and vinyl aromatics, such as those disclosed in US2004/0014911A1, or combinations of $C_4$-$C_{20}$ diolefins and vinyl aromatics.

Said $C_4$-$C_{20}$ diolefins are one or more selected from the group consisting of butadiene, isoprene, 1,3-pentadiene, piperylene, 2,3-dimethyl butadiene, 2,4-dimethyl-1,3-butadiene, cyclopentadiene, methylcyclopentadiene, 1,3-cyclohexadiene, dimethylfulvene, limonene and laurene. More preferably, diolefins are selected from conjugated or non-conjugated $C_4$-$C_{10}$ diolefins, specially conjugated $C_4$-$C_{10}$ diolefins, in particular, e.g. one or more from isoprene, piperylene, cyclopentadiene and 2,3-dimethylbutadiene, more preferably isoprene.

Vinyl aromatics are preferably selected from the group consisting of styrene, α-methyl styrene, p-methylstyrene, p-chloromethylstyrene, p-methoxystyrene, p-t-butylstyrene, p-t-butoxylstyrene, p-vinylstyrene and indene, more preferably one or more from styrene, p-methylstyrene, p-chloromethylstyrene, p-t-butylstyrene, p-vinylstyrene, most preferably one or more from p-methylstyrene, p-vinylstyrene and p-t-butylstyrene.

During the preparation of the copolymers of the present invention, any combination of isoolefins and copolymerizable monomers mentioned above can be used. Preferred combinations are selected from the group consisting of, e.g. isobutene with isoprene, isobutene with piperylene, isobutene with cyclopentadiene, isobutene with p-methylstyrene, isobutene with p-t-butyl styrene, isobutene with p-vinylstyrene. More preferred combinations are selected from the group consisting of, e.g. isobutene with isoprene, isobutene with p-methylstyrene and isobutene with p-vinylstyrene.

Said monomers can be used directly or after being formulated with the diluent into the solution. Said diluent may be the organic solvent in the reaction medium, which is selected from the mixed solvents consisting of one or more selected from the group consisting of olefins, alkanes, or cycloalkanes (e.g. ethylene, ethane, propane, butane, pentane, hexane, octane, cyclohexane, methylcyclohexane, petroleum ether) or halogenated hydrocarbons.

The polymerization reaction of the present invention includes the homopolymerization and copolymerization of monomers above. In the polymerization system, the monomers have a concentration of 0.4 mol/L-7.0 mol/L.

3. Aqueous Reaction Medium

The aqueous reaction medium of the present invention is a mixed reaction medium containing an organic solvent and water, or a reaction medium in which water is prominant or a reaction medium which is totally water. In the aqueous reaction medium, water is preferably from 3.5% to 100%, more preferably from 5% to 100% by volume in the reaction medium.

The organic solvent or diluent is any one of olefins, alkanes, cycloalkanes, aromatics or halogenated hydrocarbons, or mixtures thereof. Preferably, the organic solvent is at least one of linear or branched or cyclic $C_1$-$C_{20}$ olefins, alkanes, cycloalkanes, aromatics or halogenated hydrocarbons, preferably $C_2$-$C_3$ olefins, $C_1$-$C_{12}$ alkanes, $C_3$-$C_{12}$ cycloalkanes, aromatics or halides thereof. More specifically, the olefins are, e.g. ethylene; the organic solvent is selected from the group consisting of ethane, propane, butane, pentane, hexane, heptane, octane, nonane, decane, petroleum ether, cyclohexane, methylcyclohexane, isomers thereof and halides thereof. In the specific embodiments of the present invention, the aqueous reaction medium may contain no halogenated hydrocarbons.

Preferably, the volume ratio of water in the aqueous reaction medium to cationic-polymerizable monomers, e.g. vinyl monomers, is (0.03-25):1, preferably (0.04-23.0):1, preferably (0.05-21):1, more preferably (0.05-19):1.

In the polymerization system of the present invention, the volume ratio of the organic solvent to monomers may be (0-12):1, preferably (0-10):1.

The medium may contain additional water-soluble compounds. The water-soluble compounds are one or more selected from the group consisting of ionic compounds, such as alkaline metal salt $I_AP$ or ammonium salts, inorganic protonic acid, organic acid and the like, or alcohols, wherein $I_A$ is an alkali metal of lithium, sodium or potassium; P is chlorine, bromine or an acid radical. Said alkaline metal salts or ammonium salt compounds are one or more preferably selected from the group consisting of sodium chloride, lithium chloride, potassium chloride, potassium bromide, sodium dodecyl sulfate, sodium dodecyl sulfonate, ammonium trimethylhexadecyl bromide. The inorganic protonic acid is one or more preferably selected from sulfuric acid, hydrochloric acid and fluoboric acid. The organic acid is one or more preferably selected from $C_1$-$C_5$ saturated or unsaturated acids, e.g. formic acid and acetic acid. The alcohol is one or more preferably selected from $C_1$-$C_5$ saturated or unsaturated acids, including mono-alcohols or polyols, e.g. methanol, ethanol, propanol, ethylene glycol, propylene glycol and propanetriol. The mass ratio of the water-soluble compound to monomers is (0-8.0):1, preferably (0-6.5):1. For example, the mass ratio of the alkaline metal salt or ammonium salt in the reaction medium, or protonic acid or mixtures thereof to cation-polymerizable monomers, e.g. vinyl monomers, is (0-6.2):1. Such compound may reduce the solidifying point of the reaction medium, enabling the reaction to be conducted under a low temperature.

4. Dispersant

The present process enables the polymerization system to exhibit a heterogeneous polymerization system in a homogeneously dispersed state, so as to increase the reaction efficiency and product quality, to obtain the polymer products having a high monomer conversion and a high molecular weight of polymer resultant and to break through the current technical difficulties.

In the cationic polymerization process of the present invention, the polymerization system comprises a reaction medium, monomers, an initiator, a Lewis acid, an additive, an optional diluent and an optional dispersant, wherein monomers are cationic-homopolymerized or copolymerized to obtain the corresponding homopolymers or copolymers.

The dispersant is at least one of amphiphilic compounds.

The dispersant of the present invention is an amphiphilic compound having the general structure formula W—O, wherein W is one or more hydrophilic group selected from the group consisting of hydroxyl, carboxyl, alkoxyl, ester groups, ammonium ion, sulfate ion, and benzene sulfonate ion; O is an lipophilic group of $C_6$-$C_{20}$ alkyl, aryl, aryl $C_6$-$C_{20}$ alkyl or $C_6$-$C_{20}$ alkylaryl, which are optionally substituted by halo or nitro. If any, the mass ratio of the dispersant and monomers is (0-0.4):1, preferably $(1.0 \times 10^{-4}$–$3.0 \times 10^{-1}):1$ or preferably $(2.0 \times 10^{-4}$–$2.0 \times 10^{-1}):1$.

In one embodiment, the more preferred dispersant is at least one from alcohols, acids, alkylbenzene sulfonates, fatty acid ester sulfonates, alkyl sulfates, fatty alcohol polyoxyethylene ether, alkyl phenol polyoxyethylene ether, fatty acid polyoxyethylene ether, polyoxyethylene alkyl amine, sorbitan fatty acid ester and epoxy ethanol adducts thereof, and alkyl ammonium halide. More preferred examples include at least one from dodecyl trimethyl ammonium bromide, octylphenol polyoxyethylene ether, hexadecyl alcohol, oleic acid, sorbitan monostearate, sorbitan oleate, and polyoxyethylene sorbitol monolaurate.

In the practical application, the amount of the dispersant depends on the type of the dispersant, the type and amount of the additive, the type and amount of Lewis acid, the type and amount of monomers, the type and amount of organic solvents, and water content in the reaction medium. As for the same dispersant and the determined polymerization reaction system, if the amount of the dispersant is too low, it will not have the effect of homogeneous dispersion and be difficult in stabilizing the polymerization reaction system; if the amount of the dispersant is too high, the cost will be increased, leading to increases in the post-treatment procedures and the difficulty of isolation and purification of products although there is better dispersion effect. According to the present invention, the cationic polymerization of monomers can be achieved in an aqueous medium by using the mentioned dispersants, and the polymerization system exhibits a homogeneously dispersed effect, so as to be advantageous to increase the heat and mass transfer and simultaneously to increase the homogeneity of temperature distribution in the polymerization system, in particular to increase the polymerization conversion and the molecular weight of the product. These effects cannot be achieved by the prior art.

DESCRIPTION OF THE DRAWINGS

FIG. 1 shows a flow chart of the steps of an embodiment of the cationionic polymerization process described herein.

Detailed Description of the Invention

5. Polymerization Process

The present invention provides a process of cationic polymerization of monomers induced with the aforesaid initiating system in the aqueous reaction medium.

In the polymerization process, the polymerization system comprises a reaction medium, monomers, an initiating system, an optional diluent and an optional dispersant. According to the present invention, cationic-polymerizable monomers are homopolymerized or copolymerized with the said initiating system in an aqueous reaction medium to obtain the corresponding homopolymers or copolymers. The polymerization process is conducted by a batchwise polymerization method, a semi-continuous polymerization method or a continuous polymerization method.

The cationic polymerization of the present invention is conducted at a temperature ranging from –120° C. to 50° C., preferably from –90° C. to 35° C., more preferably from –75° C. to 15° C.

The polymerization time is a function of factors, such as monomer conversion, polymerization conditions and production efficiency, etc. The time for the cationic polymerization process according to the present invention is from 0.1 min to 120 min.

The cationic polymerization process and procedures are characterized in polymerising the vinyl monomers in an aqueous reaction medium with the initiating system of the present invention, wherein the polymerization system exhibits a homogeneously dispersed state.

The cationic polymerization process and procedures are further characterized in the cationic polymerization of vinyl monomers in an aqueous medium with the initiating system of the present invention, wherein the halogenated hydrocarbon organic medium may be not involved therein, and the reaction system exhibits a homogeneously dispersed state.

The cationic polymerization process and procedures are further characterized in polymerising vinyl monomers in a reaction medium which is totally water using the initiating system of the present invention, wherein the reaction system exhibits a homogeneously dispersed state.

The polymerization process of the present invention can be conducted in the conventional reactor, e.g. a stirred reactor or a turbulence reactor after homogeneous stirring and mixing.

The polymerization process of the present invention needs no pipeline, apparatus or procedure protected by high-purity inert gases, which is different from the prior art.

In the cationic polymerization process of the present invention, the polymer particles in the reaction system are homogeneously and stably dispersed, and not easy to agglomerate. The monomer conversion, the molecular weight and molecular weight distribution of the polymers obtained can be adjusted within a large scope. The polymerization proceeds rapidly with a high reaction efficiency, and the conversion may achieve as high as 80% within 1 h.

The present polymerization process with the dispersant, which is different from the prior art, not only can achieve the homogeneously dispersed polymerization system having fine particles with a particle size ranging from 1 μm to 3,000 μm, but also is advantageous to increase the mass transfer and heat transfer in the polymerization system, or even can achieve the effect of increasing monomer conversion and molecular weight of the polymer products, and of mediating the molecular weight distribution of the polymer products. The process of the present invention can enable the polymerization system to show a homogeneously dispersed state, even under the circumstance of increasing the polymer concentration or polymerization temperature, and can achieve the objects of increasing the production efficiency and reducing the energy consumption at the same time. The process of the present invention can also increase the production efficiency of the equipment and reduce the product cost by further increasing the monomer concentration and the monomer conversion during polymerization. In particular, as compared with the currently industrial polymerization technological process at a temperature of –100° C., the technique of the present invention can achieve polyisobutenes having a molecular weight as high as $6 \times 10^5$ or higher at polymerization temperature of –60° C., so as to achieve the object of saving energy and reducing consumption.

The present invention provides an economical and easy-to-conduct process capable of initiating the cationic polymerization of vinyl monomers in a reaction medium containing water by the initiating system in-situ produced or pre-prepared from an initiator, a common Lewis acid and a suitable additive, wherein the initiator may be additionally added, or water is used as the initiator (without adding any additional initiator having other structures). By controlling the polymerization conditions, the polymer products having a low, medium or high moleaular weight can be synthesized. In particular, the technique of the present invention can increase the molecular weight of the polymer products up to about $1 \times 10^6$, which is obviously superior to the prior art and overcomes the technical difficulty of low molecular weight of the polymer products therein.

The polymerization process of the present invention not only can simplify the polymerization process and procedures, but also can reduce the cost. Water is used as the reaction medium, and as such is environmentally-friendly and has an appreciable commercial application prospect. Taking the production of butyl rubber as an example, the improved technological process can be briefly described by FIG. 1 with using one embodiment of the present invention. As compared with the current corresponding polymerization technique, the present invention greatly simplifies the technological process, minimizes the use of solvents, recovery system and equipment, and even needs no halogenated alkane and leaves out the use of organic solvents, so as to notably reduce the equipment amount, increase the production efficiency and reduce the production cost.

The present invention has the following prominent advantages:

1. The conventional Lewis acid may be used in the cationic polymerization process conducted in an aqueous reaction medium or even a reaction medium which is totally water.
2. The aqueous reaction medium may behave better dispersion system and high heat transfer efficiency of the aqueous medium during polymerization, so as to be advantageous to increasing the homogeneity of temperature distribution in the polymerization system, controlling the product quality, reducing the energy consumption, saving the energy, decreasing the discharge and reducing the production cost.
3. The technology of the present invention may achieve the effect of using no halogenated hydrocarbons in the prior art, e.g. methyl chloride, and has the following advantageous:
    (1) replacing halohydrocarbons which are not environmentally-friendly and expensive with cheap and environmentally-friendly water, so as to reduce the cost of raw materials considerably;
    (2) eliminating the environmental pollution which may be resulted by using halogenated hydrocarbons which are not environmentally-friendly;
    (3) simplifying the technological process, and removing the chemical units of tank-storing, rectifying, recovering, drying methyl chloride and the like;
    (4) avoiding the corresponding expenditure on construction and operation, decreasing the equipment investments, conserving energy and reducing the consumption; and
    (5) eliminating the phenomena of severe corrosion of the equipment producing during the post-treatment, and the environmental pollution resulted by the tail gas;
4. producing a greater amount of products in the equipment having the same volume by increasing the monomer feeding amount and the polymer amount in the polymerization system, so as to increase the production efficiency, and to achieve the object of reducing the production cost from another aspect;
5. polymerizing at a properly increased polymerization temperature (e.g. $-60°$ C.), to reduce the burden of the refrigeration system, to decrease the cold source consumption and to reduce the energy consumption and material consumption;
6. under the conditions of using alkanes or cycloalkanes as the organic solvent in the aqueous reaction medium, obtaining a homogeneously-dispersed non-homogeneous polymerization system, changing the polymerization process, overcoming the shortcomings and problems of the current solution polymerization process, increasing the heat and mass transfer effects, improving the product quality, and increasing the monomer polymerization conversion rate and product efficiency; and
7. the present invention fulfilling the cationic polymerization of vinyl monomers in a totally aqueous medium, omitting the solvent storage tank, drying and refining system and isolating and recovering system, and saving the land occupation and construction investments of the corresponding equipments at the same time, avoiding the corresponding technological process, reducing the material consumption and energy consumption and saving the production cost.

EXAMPLES

The present application is illustrated by the following examples, but the scopes or implementing methods thereof are not limited by the examples.

In the following examples, the microstructure parameters of the polymer products are measured by the common technical means in the art, i.e. measuring the number average molecular weight, weight average molecular weight, peak molecular weight and molecular weight distribution of the product with Gel Permeation Chromatograph (GPC). The molecular weight is represented by the weight average molecular weight ($M_w$); the molecular weight distribution is represented by the distribution index ($M_w/M_n$); the measurement is conducted at a temperature of $25°$ C., wherein tetrahydrofuran is used as the mobile phase having a flow rate of 1 mL/min. $XSZ-HS_3$-type phase contrast microscope produced by Chongqing Optical Instrument Factory is used to observe microscopic morphology of the polymerization system. The microstructure and composition content of the polymers are measured by $^1$H-NMR, wherein $CDCl_3$ is used as the solvent; and tetramethylsilane (TMS) is the internal standard.

Example 1

At a temperature of $-60°$ C., water, 5 g of LiCl, 0.26 g of NaCl, 0.1 g of sorbitan monooleate and isobutene were added into the polymerization reactor, wherein the total volume was 35 mL; water in the reaction medium was in a volume fraction of 100%; and IB in the reaction system was in a concentration of 5 mol/L. The initiating system solution containing water, triphenyl phosphorus sulfide, di-tert-butyl-p-cumyl peroxide and $AlCl_3$ (the molar ratio of water:di-tert-butyl-p-cumyl peroxide:triphenyl phosphorus sulfide:$AlCl_3=6\times10^{-3}:3.4\times10^{-4}:0.7:1$) was added to initiate the polymerization and make the molar ratio of $AlCl_3$ to IB be $6.4\times10^{-3}:1$. After 1 h of the reaction, the NaOH/ethanol solution was added to terminate the reaction, wherein NaOH has a mass percent of 5%. After water-washing, coagulating and isolating the unreacted isobutene, the polymerization product containing water was then obtained. Upon air-drying with the vibration screen and dehydration by squeezing, a dried polyisobutene product was then obtained. The polymerization product yield was 65%; $M_w$ was $6.3\times10^5$; and $M_w/M_n$ was 5.0.

Example 2

At a temperature of $-60°$ C., water, 5 g of LiCl, 0.26 g of NaCl, 0.2 g of sorbitan monooleate, isoprene (IP) and isobutene were added into the polymerization reactor, wherein the total volume was 40 mL; water phase in the reaction medium was in a volume fraction of 100%; IB in the reaction system was in a concentration of 5.8 mol/L; and the molar ratio of IP to IB was 0.006:1. Under the stirring condition, the initiating system solution containing water, diphenylether, and $AlCl_3$ (the molar ratio of water:diphenylether:$AlCl_3=4.47\times10^{-2}$:4:1) was added to initiate the polymerization and make the molar ratio of $AlCl_3$ to IB be $3.8\times10^{-3}$:1. After 10 min of the polymerization, the methods for termination and post-treatment were the same as those in Example 1. The copolymer yield was 70%; $M_w$ was $1.3\times10^5$; $M_w/M_n$ was 3.2; and the IP content was 0.9 mol %.

Example 3

At a temperature of −60° C., water, 5 g of LiCl, 0.26 g of NaCl, isobutene (IB), 0.1 g of sorbitan monooleate and 0.005 g of sodium dodecyl sulfate were added into the polymerization reactor, wherein the total volume was 30 mL; water phase in the reaction medium was in a volume fraction of 100%; and [IB]=3.9 mol/L. Under the stirring condition, the initiating system containing water, p-dicumyl acetate, diphenylether and $AlCl_3$ (the molar ratio of water:p-dicumyl acetate:diphenylether:$AlCl_3=7.4\times10^{-3}$:$1\times10^{-4}$:1:1) was added to initiate the polymerization and make the molar ratio of $AlCl_3$ to IB be $3.8\times10^{-4}$:1. The polymerization system exhibited a milk-white homogeneously dispersed state. After 2 min of the polymerization, the methods for termination and post-treatment were the same as those in Example 1. The polymer yield was 24%; $M_w$ was $2.1\times10^5$; and $M_w/M_n$ was 3.4.

Example 4

At a temperature of −60° C., water, 3.8 g of LiCl, 0.2 g of NaCl, 0.2 g of sorbitan monooleate, 0.01 g of cetyl trimethyl ammonium bromide and isobutene were added into the polymerization reactor, wherein the total volume was 30 mL; water phase in the reaction medium was in a volume fraction of 100%; and [IB]=5.8 mol/L. Under the stirring condition, the initiating system containing orthocresol, phthalic ether, water and $AlCl_3$ (the molar ratio of water:orthocresol:phthalic ether:$AlCl_3=3\times10^{-2}$:$3\times10^{-2}$:0.8:1) was added to initiate the polymerization and make the molar ratio of $AlCl_3$ to IB be $5\times10^{-3}$:1. The polymerization system exhibited a homogeneously dispersed state. After 1 min of the polymerization, the methods for termination and post-treatment were the same as those in Example 1. The monomer conversion rate was 48%; $M_w$ was $1.9\times10^5$; and $M_w/M_n$ was 3.6.

Example 5

At a temperature of −60° C., water, 5 g of LiCl, 0.26 g of NaCl, 0.12 g of sorbitan monooleate, isobutene and isoprene were added into the polymerization reactor, wherein the total volume was 35 mL; water phase in the reaction medium was in a volume fraction of 100%; IB in the reaction system was in a concentration of 5 mol/L; and the molar ratio of IP to IB was 0.017:1. Under the stirring condition, the initiating system containing water, N,N-dimethyl acetamide and $AlCl_3$ (the molar ratio of water:N,N-dimethyl acetamide:$AlCl_3=2\times10^{-3}$:0.7:1) was added to initiate the polymerization and make the molar ratio of $AlCl_3$ to IB be $6\times10^{-3}$:1. After 2 min of the polymerization, the methods for termination and post-treatment were the same as those in Example 1. The polymerization product yield was 60%; $M_w$ was $8.4\times10^4$; $M_w/M_n$ was 2.5; and IP was in a content of 2.1 mol %.

Example 6

At a temperature of −60° C., water, 5 g of LiCl, 0.26 g of NaCl, 0.1 g of sorbitan monooleate and isobutene were added into the polymerization reactor, wherein the total volume was 35 mL; water phase in the reaction medium was in a volume fraction of 100%; and IB in the reaction system was in a concentration of 5 mol/L. Under the stirring condition, the initiating system containing water, diphenylether and $AlCl_3$ (the molar ratio of water:diphenylether:$AlCl_3=3\times10^{-3}$:4:1) was added to initiate the polymerization and make the molar ratio of $AlCl_3$ to IB be $5\times10^{-3}$:1. After 5 min of the polymerization, the methods for termination and post-treatment were the same as those in Example 1. The polymerization product yield was 44%; $M_w$ was $1.2\times10^5$; and $M_w/M_n$ was 3.3.

Example 7

At a temperature of −60° C., 5 g of LiCl, 0.26 g of NaCl, water, n-hexane, isobutene, and p-methylstyrene (MSt) were added into the polymerization reactor, wherein the total volume was 42 mL; water phase in the reaction medium was in a volume fraction of 100%; IB in the reaction system was in a concentration of 5.8 mol/L; and p-methylstyrene was in a concentration of 0.36 mol/L. Under the stirring condition, the initiating system containing water, diphenyl sulfoxide and $AlCl_3$ (the molar ratio of water:diphenyl sulfoxide:$AlCl_3=4\times10^{-2}$:1:1) was added to initiate the polymerization and make the molar ratio of $AlCl_3$ to IB be $6.0\times10^{-3}$:1. After 2 min of the reaction, the methods for termination and post-treatment were the same as those in Example 1. The copolymerization product yield was 40%; $M_w$ was $8.5\times10^4$; and $M_w/M_n$, was 4.0; p-methylstyrene in the copolymer had a mass percent of 20%.

Example 8

At a temperature of −60° C., isobutene, water, 7.6 g of LiCl, 0.4 g of NaCl and 0.5 mL of oleic acid were added into the polymerization reactor, wherein the total volume was 36 mL; water in the reaction medium was in a content of 100%; and IB in the reaction system was in a concentration of 1.9 mol/L. Under the stirring condition, the initiating system containing water, diphenylether and $AlCl_3$ (the molar ratio of water:diphenylether:$AlCl_3=5\times10^{-3}$:8:1) was added, and used after being deposited for 7 days to initiate the polymerization and make the molar ratio of $AlCl_3$ to IB be 0.011:1. After 5 min of the polymerization, the methods for termination and post-treatment were the same as those in Example 1. The polymer yield was 34%; $M_w$ was $7.6\times10^4$; and $M_w/M_n$ was 3.7.

Example 9

At a temperature of −60° C., isobutene, water, 7.6 g of LiCl, 0.4 g of NaCl and 0.4 g of sorbitan monooleate were added into the polymerization reactor, wherein the total volume was 44 mL; water phase in the reaction medium was in a volume fraction of 100%; and IB in the reaction system was in a concentration of 3.7 mol/L. Under the stirring condition, the initiating system containing water, diphenylether, benzyl chloride and $AlCl_3$ (the molar ratio of water:diphenylether:benzyl chloride:$AlCl_3=5\times10^{-3}$:8:$2.5\times10^{-4}$:1) was added, and used after being deposited for 7 days to initiate the polymerization and make the molar ratio of $AlCl_3$ to IB be 0.005:1.

After 3 min of the polymerization, the methods for termination and post-treatment were the same as those in Example 1. The polymer yield was 42%; $M_w$ was $3.8 \times 10^5$; and $M_w/M_n$ was 2.6.

Example 10

At a temperature of −30° C., 20 mL of IB monomers and 20 mL of an aqueous solution containing 23% LiCl and 1.2% of NaCl were added into the polymerization reactor, wherein water phase in the reaction medium was in a volume fraction of 100%; and IB in the polymerization system was in a concentration of 5.8 mol/L. After homogeneously mixing, the initiating system containing water, diphenylether and $AlCl_3$ (the molar ratio of water:diphenylether:$AlCl_3$=$3 \times 10^{-3}$:4:1) was added to initiate the polymerization and make the molar ratio of $AlCl_3$ to IB be $1 \times 10^{-2}$:1. After 10 min of the polymerization, the methods for termination and post-treatment were the same as those in Example 1. The polymer yield was 89%; $M_w$ was $7.8 \times 10^3$; and $M_w/M_n$ was 1.8.

Example 11

At a temperature of −60° C., 5 g of LiCl, 0.26 g of NaCl, water, n-hexane, isobutene, and p-methylstyrene (MSt) were added into the polymerization reactor, wherein the total volume was 42 mL; water phase in the reaction medium was in a volume fraction of 48%; n-hexane was in a volume fraction of 52%; isobutene in the reaction system was in a concentration of 1.4 mol/L; and p-methylstyrene was in a concentration of 0.4 mol/L. The initiating system containing water, tributyl phosphite, diphenyl sulfoxide and $AlCl_3$ (the molar ratio of water:tributyl phosphite:diphenyl sulfoxide:$AlCl_3$=0.2:0.02:1:1) was added to initiate the polymerization and make the molar ratio of $AlCl_3$ to IB be $1 \times 10^{-2}$:1. After 2 min of the reaction, the methods for termination and post-treatment were the same as those in Example 1. The copolymerization product yield was 58%; $M_w$ was $1.1 \times 10^5$; and $M_w/M_n$ was 6.3; p-methylstyrene in the copolymer had a mass percent of 61%.

Example 12

At a temperature of −60° C., water, 5 g of LiCl, 0.26 g of NaCl, n-hexane and isobutene (IB) were added into the polymerization reactor, wherein the total volume was 40 mL; water phase in the reaction medium was in a volume fraction of 57%; n-hexane was in a volume fraction of 43%; and isobutene in the reaction system was in a concentration of 1.5 mol/L. Under the stirring condition, the initiating system containing water, HCl, triphenylphosphine and $AlCl_3$ (the molar ratio of water:HCl:triphenylphosphine:$AlCl_3$=0.02:0.01:0.94:1) was added to initiate the polymerization and make the molar ratio of $AlCl_3$ to IB be $1.0 \times 10^{-2}$:1. After 2 min, the polymerization was terminated. The polymerization product yield was 55%; $M_w$ was $4.8 \times 10^5$; and $M_w/M_n$ was 4.3.

Example 13

At a temperature of −60° C., water, 5 g of LiCl, 0.26 g of NaCl, isobutene and n-hexane were added into the polymerization reactor, wherein the total volume was 40 mL; water phase in the reaction medium was in a volume fraction of 57%; and isobutene in the reaction system was in a concentration of 1.5 mol/L. Under the stirring condition, the initiating system containing water, triphenylphosphine oxide and $AlCl_3$ (the molar ratio of water:triphenylphosphine oxide:$AlCl_3$=0.028:1:1, which was used after being deposited for 8 days) was added to initiate the polymerization and make the molar ratio of $AlCl_3$ to IB be $5 \times 10^{-3}$:1. After 0.5 min of the reaction, the methods for termination and post-treatment were the same as those in Example 1. The polymerization product yield was 68%; $M_w$ was $4.9 \times 10^5$; and $M_w/M_n$ was 2.8.

Example 14

At a temperature of −60° C., n-hexane, isobutene, 7.6 g of LiCl, 0.4 g of NaCl and water were added into the polymerization reactor, wherein the total volume was 50 mL; water phase in the reaction medium was in a volume fraction of 63%; and isobutene in the reaction system was in a concentration of 0.46 mol/L. The initiating system containing water, sulfolane and $AlCl_3$ (the molar ratio of water:sulfolane:$AlCl_3$=0.05:0.79:1) was added to initiate the polymerization and make the molar ratio of $AlCl_3$ to IB be $3.8 \times 10^{-2}$:1. A homogeneously dispersed polymerization system was formed under stirring. After 2 min of the polymerization, the methods for termination and post-treatment were the same as those in Example 1. The polymerization product yield was 52%; $M_w$ was $5.2 \times 10^5$; and $M_w/M_n$ was 7.7.

Example 15

At a temperature of −40° C., an aqueous solution having an ethylene glycol mass fraction of 68 wt. %, isobutene, isooctane and 0.2 g of sorbitan stearate, were added into the polymerization reactor, wherein the total volume was 57 mL; water in the reaction medium was in a volume fraction of 22%; and [IB] in the reaction system=1.6 mol/L. Under stirring, the initiating system containing water, diphenyl ether and $AlCl_3$ (the molar ratio of water:biphenyl ether:$AlCl_3$=$1.5 \times 10^{-2}$:4:1) was added to initiate the polymerization and make the molar ratio of $AlCl_3$ to IB be $1.0 \times 10^{-2}$:1. The polymerization system exhibited a homogeneously dispersed state. After 10 min of the polymerization, the methods for termination and post-treatment were the same as those in Example 1. The polymer yield was 62%; $M_w$ was $2.2 \times 10^5$; and $M_w/M_n$ was 3.3.

The present invention is detailed elaborated by means of the specific examples above. However, it shall be understood that the present invention shall not be limited to these specific examples. Within the scope of the present invention, those skilled in the art can make various improvements, but these improvements obviously fall within the scope of the disclosure of the present invention.

The invention claimed is:
1. A process for cationic polymerization, comprising:
(1) forming a polymerization system comprising:
an initiating system comprising at least one initiator, at least one additive, at least one Lewis acid and at least one optional diluent, wherein said at least one additive is an organic compound comprising at least one atom chosen from nitrogen, oxygen, sulfur, and phosphor atoms, and said at least one Lewis acid has a formula chosen from $MX_n$ and $YR_{n-m}X_m$, wherein M is chosen from B, Al, Sn, Ti, Fe, Sb, and Zn; X is chosen from F, Cl, and Br; n is 2, 3, 4, or 5; m is 1, 2, or 3; Y is chosen from Al, Sn, Ti, and Zn; and R is chosen from alkyl, aryl, arylalkyl, and alkylaryl, optionally substituted by at least one halo substituent;
an aqueous reaction medium, comprising 100% water by volume thereof;

at least one isoolefin monomer and at least one optional copolymerizable monomer; and at least one optional dispersant; and (2) polymerizing the polymerization system formed in step (1), to obtain a homopolymer of the at least one isoolefin monomer or a copolymer of the at least one isoolefin monomer and the at least one optional copolymerizable monomer.

2. The process according to claim 1, wherein step (1) comprises:

forming the initiating system, and then mixing the resultant initiating system with the at least one isoolefin monomer, the at least one optional copolymerizable monomer, the aqueous reaction medium and the at least one optional dispersant; or mixing at least one entity chosen from the at least one initiator, the at least one additive, the at least one Lewis acid and the at least one optional diluent with the at least one isoolefin monomer, the at least one optional copolymerizable monomer, the aqueous reaction medium and the at least one optional dispersant.

3. The process according to claim 1, wherein the polymerization in step (2) is conducted by a method chosen from a batchwise polymerization method, a semi-continuous polymerization method, and a continuous polymerization method.

4. The process according to claim 1, wherein the at least one isoolefin monomer has the following structural formula $$CH_2=CR_1R_2$$

wherein $R_1$ is $C_1$-$C_{10}$ alkyl; $R_2$ is $C_1$-$C_{10}$ alkyl or $C_3$-$C_{10}$ cycloalkyl; and/or wherein the at least one optional copolymerizable monomer is chosen from conjugated and non-conjugated $C_4$-$C_{20}$ diolefins, and vinyl aromatic compounds.

5. The process according to claim 4, wherein $R_1$ is methyl.

6. The process according to claim 1, wherein the polymerization system exhibits a homogeneously dispersed state before, during and/or after polymerization.

7. The process according to claim 1, wherein the polymerization in step (2) is conducted at a temperature ranging from −100° C. to 50° C.

8. The process according to claim 7, wherein the temperature ranges from −85° C. to 35° C.

9. The process according to claim 8, wherein the temperature ranges from −75° C. to 15° C.

10. The process according to claim 1, wherein the particle size of the obtained homopolymer or copolymer ranges from 1 μm to 3,000 μm.

* * * * *